United States Patent
Wang et al.

(10) Patent No.: US 12,371,389 B2
(45) Date of Patent: Jul. 29, 2025

(54) ADAPTIVE SURFACE TEXTURING FOR CERAMIC MATRIX COMPOSITES

(71) Applicant: RTX Corporation, Farmington, CT (US)

(72) Inventors: Zhigang Wang, South Windsor, CT (US); Xia Tang, West Hartford, CT (US); James T. Beals, West Hartford, CT (US); Gajawalli V. Srinivasan, South Windsor, CT (US); John D. Riehl, Hebron, CT (US); Brian T. Hazel, Avon, CT (US); David A. Litton, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 722 days.

(21) Appl. No.: 17/665,069

(22) Filed: Feb. 4, 2022

(65) Prior Publication Data
US 2023/0250033 A1    Aug. 10, 2023

(51) Int. Cl.
*F01D 5/28* (2006.01)
*B28B 1/00* (2006.01)
(Continued)

(52) U.S. Cl.
CPC ............ *C04B 41/5059* (2013.01); *B28B 1/00* (2013.01); *C04B 41/4531* (2013.01);
(Continued)

(58) Field of Classification Search
CPC . C04B 41/5056; C04B 41/4531; C04B 41/52; C04B 41/89; C04B 2235/74;
(Continued)

(56) References Cited

U.S. PATENT DOCUMENTS 6,503,574 B1    1/2003    Skelly et al.
9,713,912 B2    7/2017    Lee
(Continued)

FOREIGN PATENT DOCUMENTS

CN    110227884 A    9/2019

OTHER PUBLICATIONS

Cheng et al., "Coaxial helical gas assisted laser water jet machining of SiC/SiC ceramic matrix composites" Journal of Materials Processing Technology 293 (Jul. 2021): 117067 (15 pages).
(Continued)

*Primary Examiner* — David E Sosnowski
*Assistant Examiner* — Theodore C Ribadeneyra
(74) *Attorney, Agent, or Firm* — CANTOR COLBURN LLP

(57) ABSTRACT

An adaptive surface texturing method is provided for use with a part formed of ceramic matrix composites (CMCs) to be coated with an environmental barrier coating (EBC). The method includes coating a CMC surface of the part with an initial coating, determining a contour and an undulation pattern of the CMC surface and designing a texturing pattern to follow the contour and the undulation pattern and to be formed in the initial coating based on a thickness of the initial coating and an average particle size of a slurry of the EBC.

20 Claims, 6 Drawing Sheets

(51) Int. Cl.
- *C04B 41/45* (2006.01)
- *C04B 41/50* (2006.01)
- *C04B 41/52* (2006.01)
- *C04B 41/89* (2006.01)

(52) U.S. Cl.
CPC .............. *C04B 41/52* (2013.01); *C04B 41/89* (2013.01); *F01D 5/282* (2013.01); *F01D 5/284* (2013.01); *F01D 5/288* (2013.01); *C04B 2235/74* (2013.01); *F05D 2230/90* (2013.01)

(58) Field of Classification Search
CPC . B28B 1/00; F01D 5/282; F01D 5/284; F01D 5/288; F05D 2230/90
See application file for complete search history.

(56) References Cited

U.S. PATENT DOCUMENTS

| | | | | |
|---|---|---|---|---|
| 11,131,014 | B2* | 9/2021 | Yokota | C23C 28/04 |
| 11,624,289 | B2* | 4/2023 | Gong | F01D 5/288 |
| | | | | 428/332 |
| 2015/0118444 | A1* | 4/2015 | Lipkin | B05D 3/007 |
| | | | | 427/256 |
| 2016/0214907 | A1* | 7/2016 | Shim | C04B 35/573 |
| 2017/0073277 | A1* | 3/2017 | Shim | C04B 41/009 |
| 2017/0121232 | A1 | 5/2017 | Nelson et al. | |
| 2018/0214982 | A1 | 8/2018 | Richerzhagen et al. | |
| 2019/0084091 | A1 | 3/2019 | Hu | |
| 2019/0375689 | A1* | 12/2019 | Saha | F01D 25/005 |
| 2019/0389171 | A1 | 12/2019 | Nelson | |
| 2020/0055083 | A1* | 2/2020 | Beals | B05D 3/142 |
| 2020/0370439 | A1 | 11/2020 | Nelson et al. | |
| 2021/0095571 | A1 | 4/2021 | Fernandez | |
| 2021/0189904 | A1* | 6/2021 | Kracum | F01D 25/08 |

OTHER PUBLICATIONS

Search Report issue din European Patent Application No. 23154552.6; Application Filing Date Feb. 1, 2023; Date of Mailing Jun. 30, 2023 (8 pages).

* cited by examiner

Plain

Twill

Satin

ADAPTIVE SURFACE TEXTURING FOR CERAMIC MATRIX COMPOSITES

BACKGROUND

The present disclosure relates to adaptive texturing for ceramic matrix composites (CMCs) used in gas turbine engine components and, more particularly, to adaptive surface texturing for applying environmental barrier coatings (EBCs) to CMCs of gas turbine engine components.

Recently, ceramic matrix composites (CMCs) have been proposed as materials for components of gas turbine engines, such as blades and vanes. CMCs are a subgroup of composite materials and a subgroup of ceramics. They include ceramic fibers embedded in a ceramic matrix. The ceramic fibers and the matrix both can include any ceramic material. As compared to metallic materials that have been traditionally used in gas turbine engines, CMCs can offer improved strength and heat resistance as well as reduced weight.

When CMCs are used as materials for gas turbine engine components, such as blades and vanes, CMCs are generally laid down in various patterns over mandrels or other support structures in order to form the blade or vane shapes. The CMCs are then repeatedly compressed and heated until the desired blade or vane shape is achieved. During and after these compression and heating processes, infiltration processes are executed to provide a matrix for the ceramics. In the industry, there are several infiltration processes including, but not limited to, melt infiltration, chemical vapor infiltration (CVI), precursor polymer infiltration, slurry infiltration, etc. In CVI, in particular, or in other infiltration processes, an "initial coating layer" of silicon carbide (SiC) is initially built up on exterior surfaces of CMC parts. The build-up of this initial coating layer can then be followed by machining operations and subsequent additional CVI operations to achieve a desired or total thickness of the initial coating layer.

While CMCs offer certain advantages over metallic materials for gas turbine engine components, such as blade and vanes, the formation process remains difficult to perform and can result in surfaces that cannot be coated as needed for use in high-temperature and high-pressure environments. Previously, this issue has been handled manually, using machining tools that are inherently messy and require significant cleanup, and often resulted in sub-optimal results.

Accordingly, a need exists for a method or system to improve adaptive surface texturing for ceramic matrix composites (CMCs) of gas turbine engine components.

BRIEF DESCRIPTION

According to an aspect of the disclosure, an adaptive surface texturing method is provided for use with a part formed of ceramic matrix composites (CMCs) to be coated with an environmental barrier coating (EBC). The method includes coating a CMC surface of the part with an initial coating, determining a contour and an undulation pattern of the CMC surface and designing a texturing pattern to follow the contour and the undulation pattern and to be formed in the initial coating based on a thickness of the initial coating and an average particle size of a slurry of the EBC.

In accordance with additional alternative embodiments, the initial coating includes silicon carbide and has a thickness of about 75-250 microns.

In accordance with additional alternative embodiments, the determining includes an optical measurement of the CMC surface from which the contour and the undulation pattern are derived.

In accordance with additional alternative embodiments, the texturing pattern includes grooves.

In accordance with additional alternative embodiments, the designing includes restricting a depth of the grooves to be shallower than the thickness of the initial coating.

In accordance with additional alternative embodiments, the designing includes establishing a critical dimension of the grooves in accordance with the average particle size of the EBC.

In accordance with additional alternative embodiments, the designing includes sizing the grooves in accordance with relative locations of the grooves in the undulation pattern.

In accordance with additional alternative embodiments, the designing includes arranging the grooves in accordance with an orientation of the fibers in the undulation pattern.

In accordance with additional alternative embodiments, the method further includes imparting the texturing pattern to the initial coating and applying the EBC following the imparting.

According to an aspect of the disclosure, an adaptive surface texturing method is provided for use with a part formed of ceramic matrix composites (CMCs) to be coated with an environmental barrier coating (EBC). The method includes completing a formation of the part and a chemical vapor infiltration (CVI) process to initially coat a CMC surface thereof with an initial coating, determining a contour and an undulation pattern of the CMC surface and designing a texturing pattern to follow the contour and the undulation pattern and to be formed in the initial coating based on a thickness of the initial coating and an average particle size of a slurry of the EBC.

In accordance with additional alternative embodiments, the initial coating includes silicon carbide and has a thickness of about 75-250 microns.

In accordance with additional alternative embodiments, the determining includes optical measurement of the CMC surface from which the contour and the undulation pattern are derived.

In accordance with additional alternative embodiments, the texturing pattern includes grooves.

In accordance with additional alternative embodiments, the designing includes restricting a depth of the grooves to be shallower than the thickness of the initial coating.

In accordance with additional alternative embodiments, the designing includes establishing a critical dimension of the grooves in accordance with the average particle size of the EBC.

In accordance with additional alternative embodiments, the designing includes sizing the grooves in accordance with relative locations of the grooves in the undulation pattern.

In accordance with additional alternative embodiments, the designing includes arranging the grooves in accordance with an orientation of the fibers in the undulation pattern.

In accordance with additional alternative embodiments, the method further includes imparting the texturing pattern to the initial coating and applying the EBC following the imparting.

According to an aspect of the disclosure, a ceramic matrix composite (CMC) surface of a part formed of CMCs is provided. The CMC surface includes fibers weaved with one another, an initial coating having a texturing pattern formed therein and an environmental barrier coating (EBC) applied to the initial coating. The texturing pattern includes grooves which are shallower than a thickness of the initial coating and which have a critical dimension that exceeds an average particle size of a slurry of the EBC.

In accordance with additional alternative embodiments, the groves are sized in accordance with relative locations of the grooves in an undulation pattern of the fibers and arranged in accordance with an orientation of the fibers in the undulation pattern.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
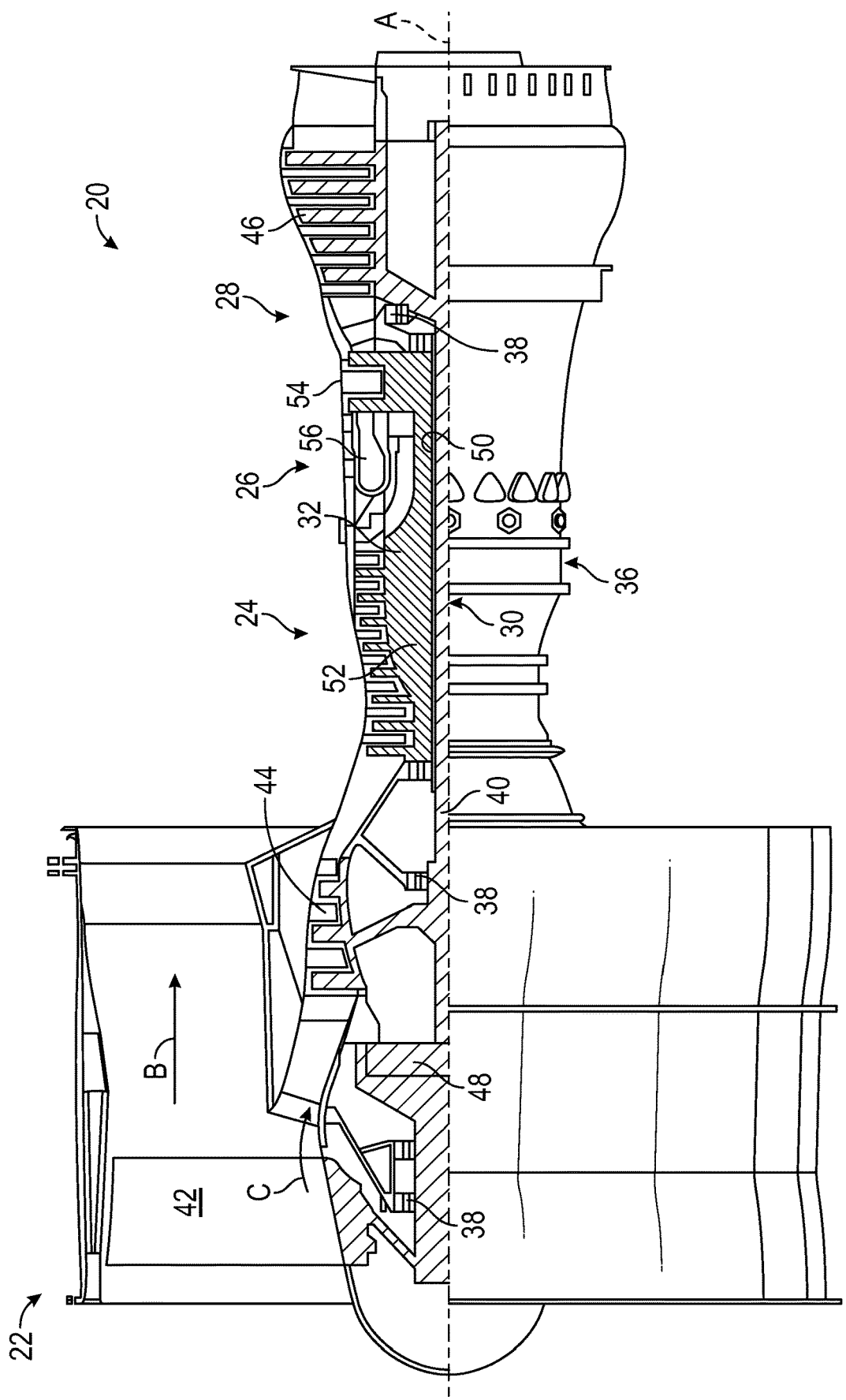
FIG. 1 a partial cross-sectional illustration of a gas turbine engine according to a non-limiting embodiment.

With reference now to FIG. 1, a gas turbine engine 20 is illustrated according to a non-limiting embodiment. The gas turbine engine 20 is disclosed herein as a multi-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with multi-spool turbofans as the teachings may be applied to other types of turbine engines including, for example, three-spool architectures.

The exemplary engine 20 generally includes one or more low-spool generator machines 30, referred to herein as a "low-spool" 30 and a high-spool generator machine 32, referred to herein as a "high-spool 32" mounted for rotation about an engine central longitudinal axis (A) relative to an engine static structure 36 via several bearing systems 38. It should be understood that various bearing systems 38 at various locations may alternatively or additionally be provided, and the location of bearing systems 38 may be varied as appropriate to the application.

The low-spool 30 generally includes an inner shaft 40 that interconnects a fan 42, a low-pressure compressor 44 and a low-pressure turbine 46. The inner shaft 40 is connected to the fan 42 through a speed change mechanism, which in exemplary gas turbine engine 20 is illustrated as a geared architecture 48 to drive the fan 42 at a lower speed than the low-spool 30. The high-spool 32 includes an outer shaft 50 that interconnects a high-pressure compressor 52 and high-pressure turbine 54. A combustor 56 is arranged in exemplary gas turbine 20 between the high-pressure compressor 52 and the high-pressure turbine 54. An engine static structure 36 is arranged generally between the high-pressure turbine 54 and the low-pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The turbines 46, 54 rotationally drive a respective low-spool 30 and high-spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

To protect CMC materials inside engine environments, such as where one or more components of a gas turbine engine, such as the gas turbine engine 20 of FIG. 1, the surfaces of the CMC materials or need to be protected by application of an EBC coating to the initial coating formed as a result of CVI processes. However, it has been found that even for those CMC material surfaces with relatively high degrees of roughness, EBC coating adhesion can be quite poor due to poor wetting behavior on untreated CMC substrates. Thus, a surface treatment is needed for the initial coating prior to the application of the EBC coating to the initial coating. Particularly, for CMC surfaces with uniform undulations, it would be more desirable to use a well-controllable method to create surface patterns in the initial coating to thereby enhance EBC bond strength.

Thus, as will be described below, an adaptive texturing process is developed using a machining system by integrating model-based texture design, data derived from an inline optical measurement sensor and process data from a cutting tool controller to form certain groove patterns in an initial coating of a CMC substrate that is formed as a result of CVI processing. The groove patterns can have different depths and can be designed along fiber directions to improve wettability and to avoid weakening CMC material strength. With a high-precision and low-coherence interferometry system, an inline quantitative information of the process (current feature geometry, laser condition, depth of cut and machining conditions) can be acquired during pulsed laser texturing. This information is then used for adaptively controlling the scanning speed for laser texturing to machine grooves with variable depths into the initial coating.

Figure 2:
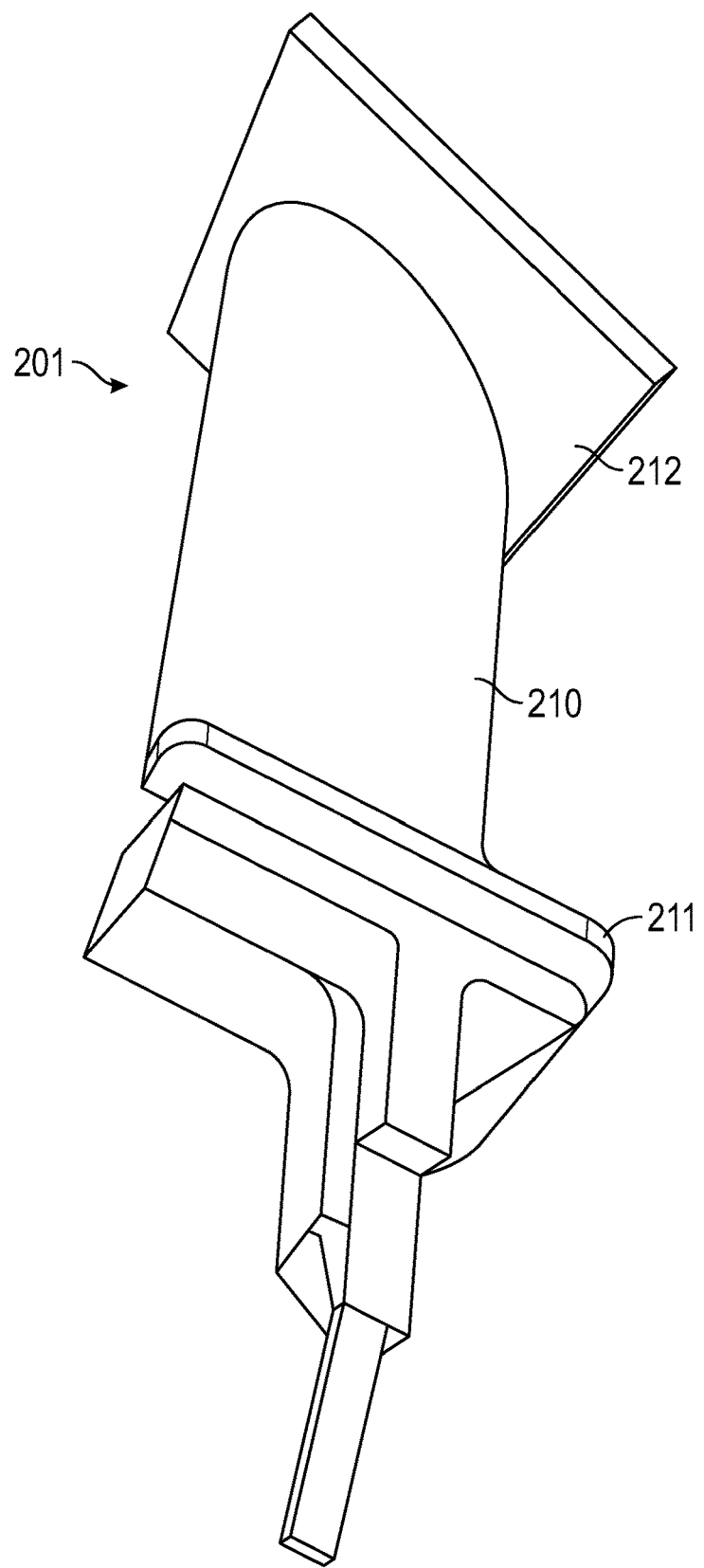
FIG. 2 is a perspective view of a vane of a gas turbine engine that is at least partially formed of ceramic matrix composites (CMCs) in accordance with embodiments.
Figure 3:
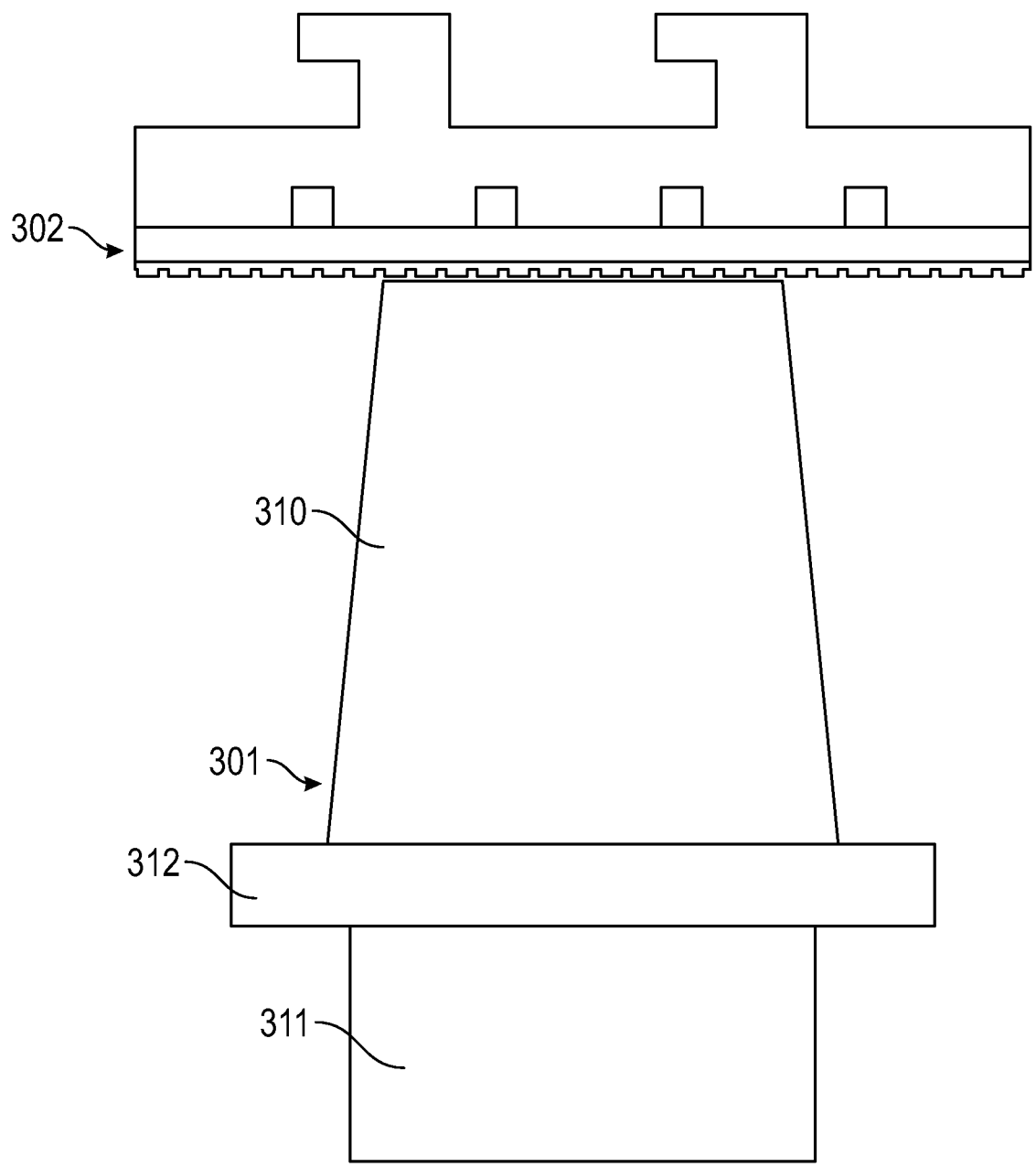
FIG. 3 is a side view of an airfoil and a blade outer air seal (BOAS) of a gas turbine engine that are at least partially formed of ceramic matrix composites (CMCs) in accordance with embodiments.

With reference to FIGS. 2 and 3, the gas turbine engine 20 of FIG. 1 can include many components that are made with CMCs. These include, but are not limited to, a vane 201 (see FIG. 2), an airfoil 301 (see FIG. 3) and a BOAS 302 (see FIG. 3).

As shown in FIG. 2, the vane 201 can be operably disposed in the compressor section 24 or the turbine section 28 and includes an airfoil section 210 radially interposed between an inner platform 211 and an outer platform 212. The airfoil section 210 has leading and trailing edges and pressure and suction surfaces extending between the leading and trailing edges. At least the airfoil section 210, the inner platform 211 and the outer platform 212 have gas path facing surfaces that are formed of CMCs. These gas path facing surfaces face toward high-temperature and high-pressure gas paths and thus need to have an EBC applied thereto.

As shown in FIG. 3, the airfoil 301 and the BOAS 302 can be operably disposed in the compressor section 24 or the turbine section 28. The airfoil 301 includes an airfoil section 310, a root 311 and a platform 312 that is radially interposed between the root 311 and the airfoil section 310. The airfoil section 310 has leading and trailing edges and pressure and suction surfaces extending between the leading and trailing edges. At least the airfoil section 310 and the platform 312 have gas path facing surfaces that are formed of CMCs. These gas path facing surfaces face toward high-temperature and high-pressure gas paths and thus need to have an EBC applied thereto. The BOAS 302 can be disposed to face the distal tip of the airfoil section 310 and has gas path facing surfaces that are formed of CMCs. As above, these gas path facing surfaces face toward high-temperature and high-pressure gas paths and thus need to have an EBC applied thereto.

Figure 4:
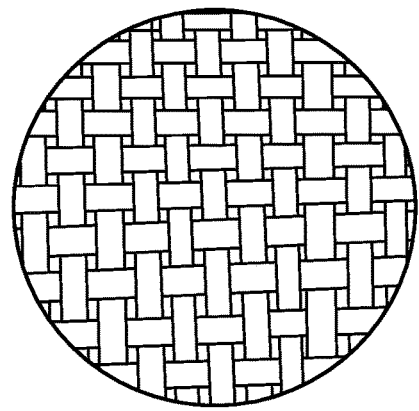
FIG. 4 is a top-down view of CMC wave patterns in accordance with embodiments.
Figure 4:
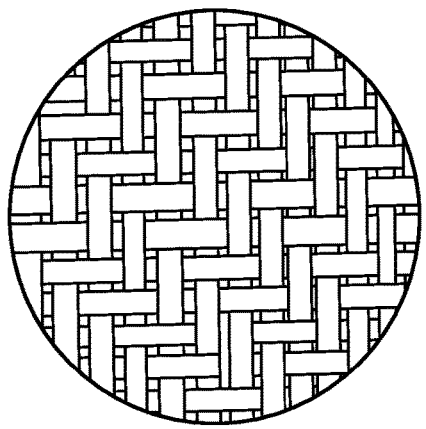

CMC parts, such as the vane 201, the airfoil 301 and the BOAS 302 of FIGS. 2 and 3, present a surface appearance that is undulating and relatively rough. With reference to FIG. 4, the undulation configuration typically depends on a selected weaving architecture (i.e., the most common weaving patterns: plain, twill and satin), whereas roughness is associated with a relatively thick CVI matrix layer (i.e., the "initial coting") with a thin "seal-coat," particularly when the matrix is deposited by chemical vapor infiltration (CVI).

To protect CMC materials of the CMC parts for use in high-temperature and high-pressure environments, the initial coating of the CMC surfaces need to be protected by application of the EBC. Such application is important because EBC failure due to a lack of EBC durability can lead to a rapid reduction in CMC part life. As such, novel EBC chemistries, creative EBC designs and robust processes are often required to meet EBC durability challenges and requirements.

In particular, roughness can be created on the initial coating of the CMC surfaces to help to increase surface area and total surface energies. As the surface roughness increases, contact angles of the surfaces gradually decrease. However, for the initial coating of the CMC surfaces even with highly rough surfaces, a water contact angle of even greater than 65° has been observed due to the presence of air pockets in those cavities around tow-tow crossing sections. Contact angles are a classical method to describe the adhesion of a contaminant liquid to a solid, such as, water-based coatings, or similar contaminants. Normally due to poor wetting behavior of the EBC coating on untreated CMC substrates, the EBC coating adhesion was quite poor.

Therefore, surface treatments, such as grit blasting or chemical etching, can be needed prior to EBC coating. With grit blasting, random irregularities are introduced on initial coatings of CMC surfaces due to the impact of the abrasive particles, though this method can also result in potential defects/cracks and embedded grit particles on the initial coatings of the CMC substrate. For CMC surfaces with uniform undulations, it would be more desirable to use a well-controllable method, such as laser surface texturing to create surface patterns in the initial coatings to enhance EBC bond strength.

Laser surface texturing is a promising technology for wide applications of functional surfaces with specific properties like antibacterial, anticorrosion, adhesive, hydrophobic, light absorbing, low friction, self-cleaning, etc. Advancements have been made in this field recently, but it takes from minutes up to hours to produce about one square centimeter of a functional surface in most cases. Even with the availability of high-power ultrashort pulsed lasers productivity still may not be dramatically increased, because there are physical limitations of current processing methods. These include heat accumulation and oxidation, plasma shielding effect and precision at high speeds. To address these issues, waterjet guided laser (WJGL) surface texturing methods have been proposed and can be at least ten times more productive than laser surface texturing with no heat accumulation effects and virtually unlimited numbers of complex shape objects can be produced with high precision.

The main objective of the present disclosure is to develop a method of obtaining CMC parts with a controlled surface state to improve the EBC bond strength. To this end, an adaptive texturing process is developed using WJGL machining system by integrating model-based texture design, an inline optical measurement sensor and process data from CNC controller. With the high precision low coherence interferometry system, an inline quantitative information of the WJGL process (current feature geometry, laser condition, depth of cut and machining conditions) can be acquired during pulsed laser texturing process. This information is then used for adaptively controlling the scanning speed for laser texturing to machine grooves in the initial coatings with variable depths. This adaptive laser texturing process can improve process reliability and generate controllable surface patterns for down streaming coating process.

Figure 5A:
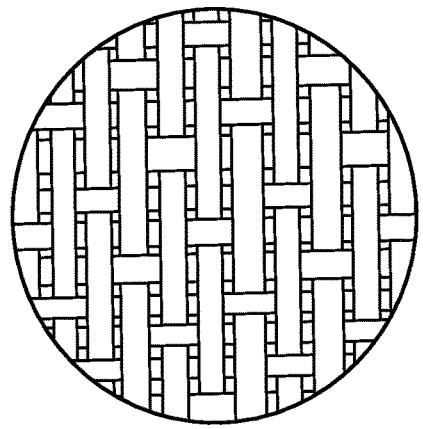
FIG. 5A is a side view of a CMC surface with an initial coating and an EBC in accordance with embodiments.
Figure 5A:
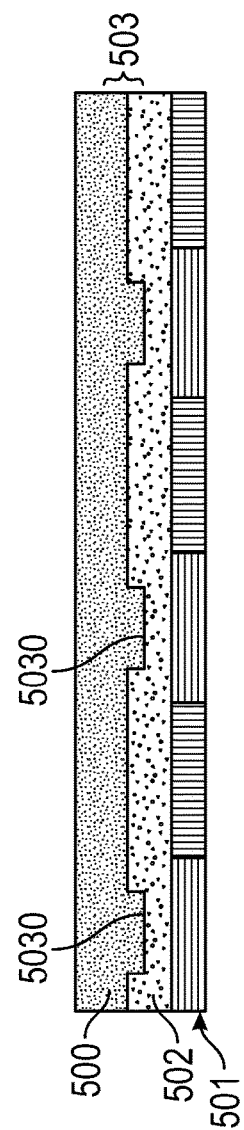
Figure 5B:
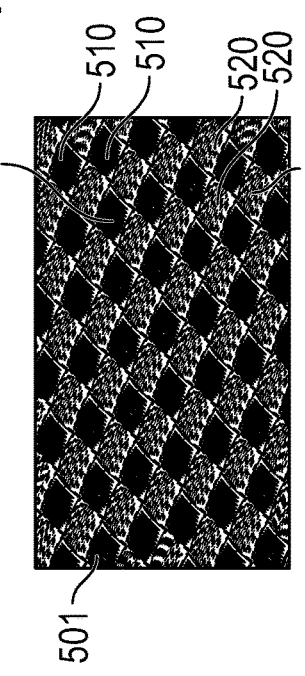
FIG. 5B is perspective view of a CMC surface in accordance with embodiments.
Figure 5C:
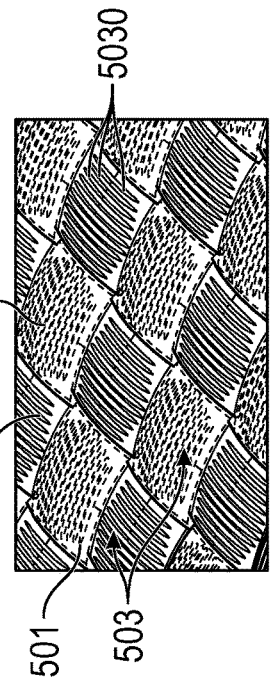
FIG. 5C is an enlarged perspective view of the CMC surface of FIG. 5B in accordance with embodiments.
Figure 6:
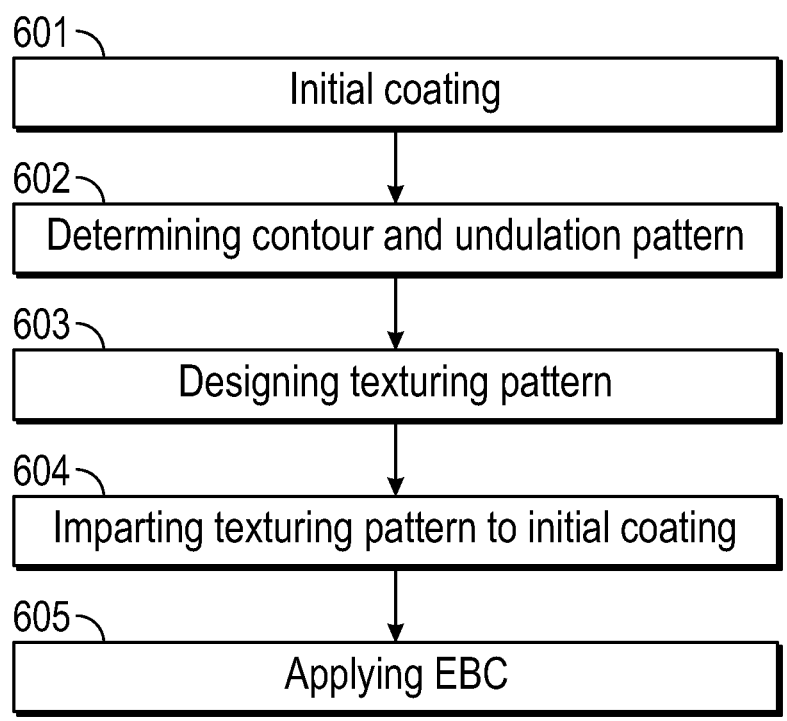
FIG. 6 is a flow diagram illustrating an adaptive surface texturing method for use with a part formed of CMCs to be coated with an EBC.

With reference to FIGS. 5A, 5B and 5C and to FIG. 6, an adaptive surface texturing method is provided for use with a part formed of ceramic matrix composites (CMCs), such as the vane 201, the airfoil 301 and the BOAS 302 of FIGS. 2 and 3, which is to be coated with an EBC 500. The method includes completing a formation of the part and a chemical vapor infiltration (CVI) process to initially coat a CMC surface 501 thereof with an initial coating 502 (block 601). The initial coating can be formed of CVI processes or other infiltration processes. The initial coating can include silicon carbide (SiC) and can be about 75-250 microns thick or, in some cases, 75-175 microns thick. The method also includes determining, by optical measurement or by another suitable measurement operation of the CMC surface 501, a contour and an undulation pattern of the CMC surface 501 (block 602). This contour can be a macroscopic contour of a portion of the part and the undulation pattern of the CMC surface 501 can be a microscopic pattern (for example, where the part is the airfoil 301 of FIG. 3, the contour can be a macroscopic portion of the pressure surface and the undulation pattern can have a microscopic scale as compared to a size of the portion of the pressure surface). The contour and the undulation pattern of the CMC surface 501 can be derived from the optical measurement. In addition, the method can include designing a texturing pattern 503 to follow the contour and the undulation pattern of the CMC surface 501 and to be formed in the initial coating 502 based on a thickness of the initial coating 502 and an average particle size of a slurry of the EBC 500 (block 603).

The method can also include imparting the texturing pattern 503 to the initial coating 502 (block 604) by WJGL surface texturing methods or other similar processing methods, for example, and applying the EBC 500 following the imparting (block 605).

As a result of the method, the CMC surface 501 includes fibers 510 and 520 that are woven with one another to form the undulation pattern, the initial coating 502 having the texturing pattern 503 formed therein and the EBC 500 applied to the initial coating 502.

The texturing pattern 503 can include grooves 5030. These grooves 5030 have depths that are shallower than the thickness of the initial coating 502 and a critical dimension (i.e., depth or width) that is defined in accordance with or exceeds an average particle size of the slurry of the EBC 500. The depths of the grooves 5030 can be about 25-50% of the thickness of the initial coating 502 and, in some cases, the depths of the grooves 5030 can be about 50% of the thickness of the initial coating 502. The grooves 5030 can be sized in accordance with their relative locations in the undulation pattern (i.e., grooves 5030 near the center of the undulation pattern can be larger than the grooves 5030 at the sides). The grooves 5030 can be, but are not required to be, aligned with orientations of the fibers 510 and 520 of the CMC surface 501.

By restricting the depths of the grooves 5030 to be less than the thickness of the initial coating and, in some cases, by aligning the grooves 5030 with the orientations of the fibers 510 and 520 of the CMC surface 501, fiber damage or breakage can be avoided. In addition, the dimensions of the grooves 5030 can be defined in accordance with the average particle size of the slurry of the EBC 500 in order to improve wettability to make connections and avoid air pockets at cavities between tow-tow crossing sections.

In accordance with embodiments, the EBC 500 can include or be provided with multiple layers. Each of these multiple layers can have a unique average particle size among other unique characteristics. In these or other cases, to whatever extent the designing of the texturing pattern 503 is partially based on the average particle size of the slurry of the EBC 500, it is to be understood that the designing of the texturing pattern 503 can be based on the average particle size of the layer of the EBC 500 which is adjacent to the initial coating 502 (i.e., the first or lowest layer of the EBC 500). The average particle size of the layer of the EBC 500 which is adjacent to the initial coating can be chosen to optimize an oxidation resistance of this layer of the EBC 500, to allow for conformal contact to the initial coating of the CMC surface and to increase bonding surface area.

In accordance with embodiments, an average particle size for the EBC layer which is adjacent to the initial coating can be about 5-75 µm, depending on particle size distributions, and, in some cases, can be about 10-14 µm. In these or other cases, a range of average particle size for the EBC layer which is adjacent to the initial coating to groove depths of the texturing pattern 503 can be about 0.35 to 0.65.

Figure 7B:
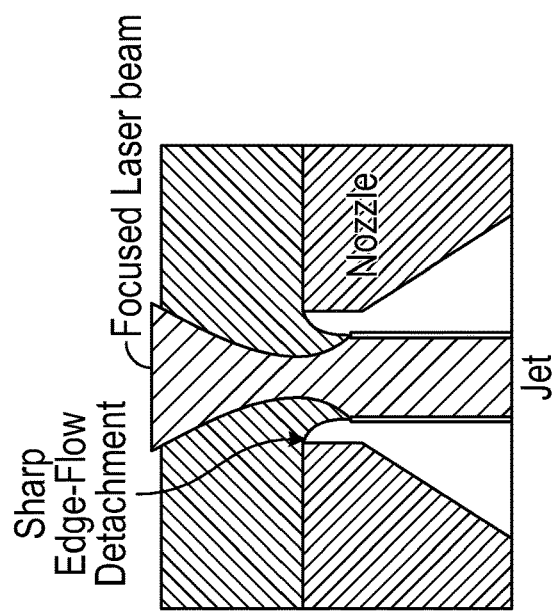
FIG. 7B is a side view of a nozzle of the laser ablation tool of FIG. 7A in accordance with embodiments.
Figure 7C:
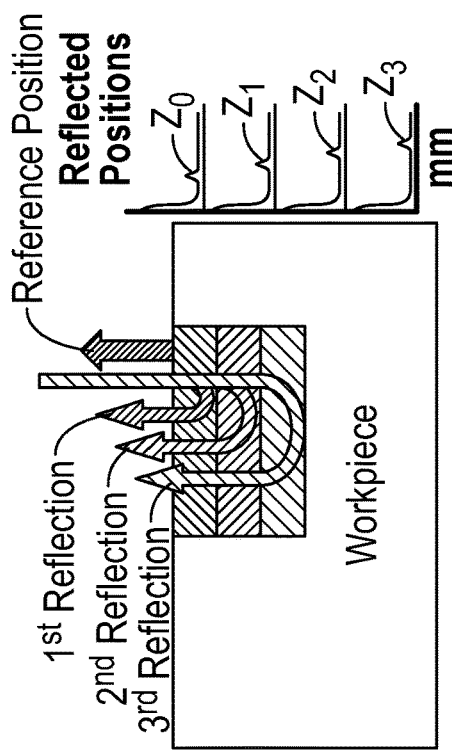
FIG. 7C is a side view of an optical response of a CMC surface with which the laser ablation tool of FIG. 7A is used in accordance with embodiments.
Figure 7A:
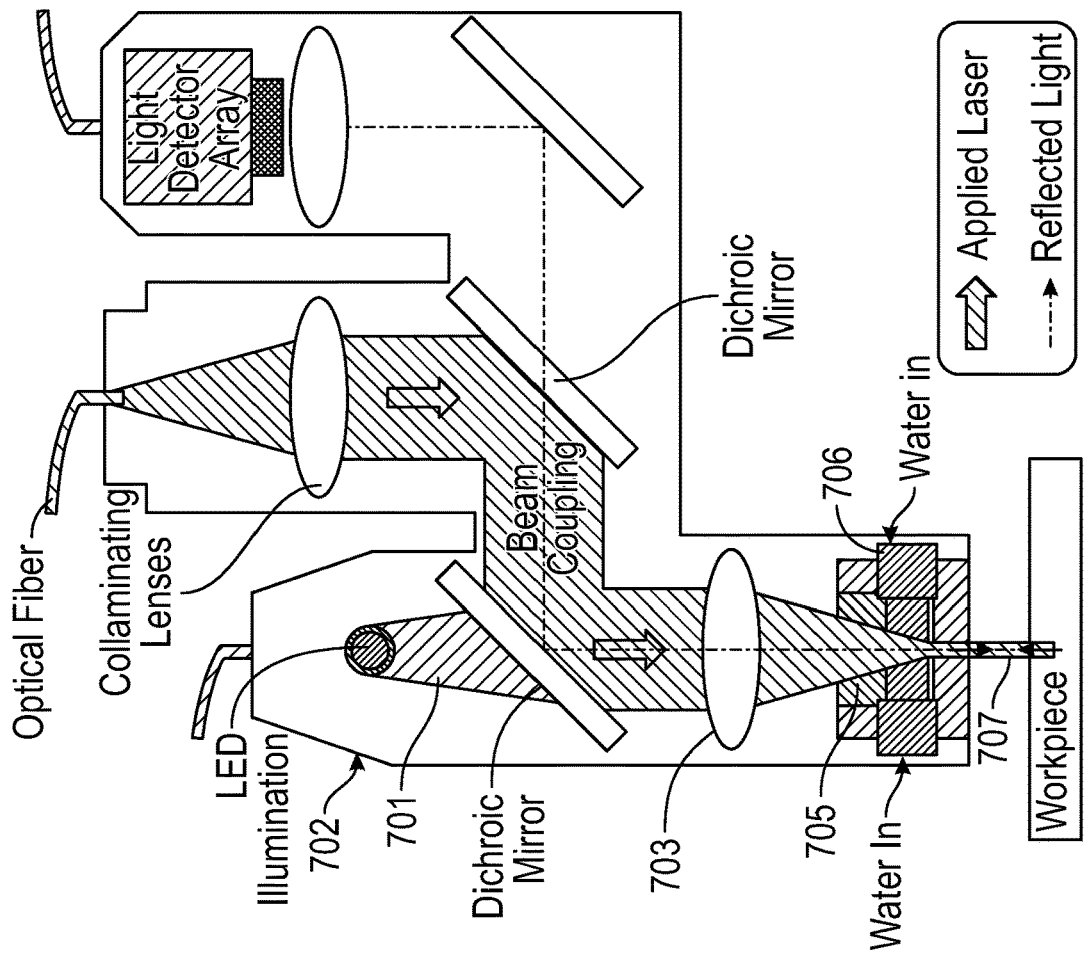
FIG. 7A is a side view of a laser ablation tool in accordance with embodiments.

With reference to FIGS. 7A, 7B and 7C, the WJGL surface texturing methods or other laser texturing methods operate by moving a laser beam 701 which ablates material from the CMC surface 501 to form the designed features (i.e., the grooves 5030) of FIGS. 5A, 5B and 5C. During ablation, the laser beam 701 follows a prescribed tool path and is collimated in an optical head 702 and then focused by focusing objective lenses 703 into a nozzle opening 704 through a transparent window 705. A nozzle duct inlet 706, where a laminar waterjet 707 is formed is illuminated and a coaxial camera facilitates the alignment of focusing. For a collimated beam, the diffraction-limited focal spot size of a laser beam depends on its wavelength, the size of the beam at the lens and its beam quality factor. Here, the measurement system is integrated in the laser beam optical path, so that no additional light source is needed. An intensity is modulated by the optical path difference and the system can recover the surface position (relative to the reference known position) through a Fourier transform of the interferometric signal. The measured data is processed through a controller to obtain vertical height information with respect to current machined feature positions and the associated working steps. The real time measurement results during laser ablation enables the adaptive scanning speed control to machine accurate shapes and improve productivity and quality.

Technical effects and benefits of the present disclosure provide for groove patterns in a CMC substrate that can be, but are not required to be, designed along fiber directions to improve wettability and avoid weakening CMC material strength. The methods described herein make it possible to significantly improve surface states of CMC parts for EBC coating. Processing information in a CNC controller and use of inline optical measurements enable adaptive feedback control of scanning speed to improve the laser process robustness and productivity, as well as enhance the machined CMC part quality by accurate 3D surface measurements.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An adaptive surface texturing method for use with a part formed of ceramic matrix composites (CMCs) to be coated with an environmental barrier coating (EBC), the method comprising:
   coating a CMC surface of the part with an initial coating, the CMC surface comprising fibers that are woven together;
   determining a macroscopic contour and microscopic undulation pattern of the CMC surface, the microscopic undulation pattern being formed by the fibers that are woven together; and
   designing a texturing pattern to follow the macroscopic contour and the microscopic undulation pattern of the CMC surface and to be formed in the initial coating based on a thickness of the initial coating and an average particle size of a slurry of the EBC.

2. The method according to claim 1, wherein the initial coating comprises silicon carbide and has a thickness of about 75-250 microns.

3. The method according to claim 1, wherein the determining comprises an optical measurement of the CMC surface from which the macroscopic contour and the microscopic undulation pattern are derived.

4. The method according to claim 1, wherein:
   the fibers comprise first fibers having a first orientation and second fibers having a second orientation,
   the first fibers and the second fibers form a weaving pattern defining the microscopic undulation pattern, and
   the texturing pattern comprises:
   first grooves to be formed in the initial coating at first locations where the first fibers overlie the second fibers and to have long axes aligned with orientations of the first fibers; and
   second grooves to be formed in the initial coating at second locations where the second fibers overlie the first fibers and to have long axes aligned with orientations of the second fibers.

5. The method according to claim 4, wherein the designing comprises;
   restricting a depth of the first grooves to be shallower than the thickness of the initial coating at the first locations; and
   restricting a depth of the second grooves to be shallower than the thickness of the initial coating at the second locations.

6. The method according to claim 4, wherein the designing comprises establishing a critical dimension of the first grooves and of the second grooves in accordance with the average particle size of the EBC.

7. The method according to claim 4, wherein the designing comprises;
   sizing the first grooves at each one of the first locations to decrease in length with decreasing distance to adjacent ones of the second locations; and
   sizing the second grooves at each one of the second locations to decrease in length with decreasing distance to adjacent ones of the first locations.

8. The method according to claim 4, wherein the designing comprises;
   arranging the first grooves in accordance with the orientation of the first fibers at each of the first locations in the microscopic undulation pattern; and
   arranging the second grooves in accordance with the orientation of the second fibers at each of the second locations in the microscopic undulation pattern.

9. The method according to claim 1, further comprising:
   imparting the texturing pattern to the initial coating; and
   applying the EBC following the imparting.

10. An adaptive surface texturing method for use with a part formed of ceramic matrix composites (CMCs) to be coated with an environmental barrier coating (EBC), the method comprising:
    completing a formation of the part and a chemical vapor infiltration (CVI) process to initially coat a CMC surface thereof with an initial coating, the CMC surface comprising fibers that are woven together;
    determining a macroscopic contour and aft microscopic undulation pattern of the CMC surface, the microscopic undulation pattern being formed by the fibers that are woven together; and
    designing a texturing pattern to follow the macroscopic contour and the microscopic undulation pattern of the CMC surface and to be formed in the initial coating based on a thickness of the initial coating and an average particle size of a slurry of the EBC.

11. The method according to claim 10, wherein the initial coating comprises silicon carbide and has a thickness of about 75-250 microns.

12. The method according to claim 10, wherein the determining comprises optical measurement of the CMC surface from which the macroscopic contour and the microscopic undulation pattern are derived.

13. The method according to claim 10, wherein:
    the fibers comprise first fibers having a first orientation and second fibers having a second orientation, the first fibers and the second fibers form a weaving pattern defining the microscopic undulation pattern, and the texturing pattern comprises:

first grooves to be formed in the initial coating at first locations where the first fibers overlie the second fibers and to have long axes aligned with orientations of the first fibers; and second grooves to be formed in the initial coating at second locations where the second fibers overlie the first fibers and to have long axes aligned with orientations of the second fibers.

14. The method according to claim 13, wherein the designing comprises;

restricting a depth of the first grooves to be shallower than the thickness of the initial coating at the first locations; and restricting a depth of the second grooves to be shallower than the thickness of the initial coating at the second locations.

15. The method according to claim 13, wherein the designing comprises establishing a critical dimension of the first grooves and of the second grooves in accordance with the average particle size of the EBC.

16. The method according to claim 13, wherein the designing comprises;

sizing the first grooves at each one of the first locations to decrease in length with decreasing distance to adjacent ones of the second locations; and sizing the second grooves at each one of the second locations to decrease in length with decreasing distance to adjacent ones of the first locations.

17. The method according to claim 13, wherein the designing comprises;

arranging the first grooves in accordance with the orientation of the first fibers at each of the first locations in the microscopic undulation pattern; and arranging the second grooves in accordance with the orientation of the second fibers at each of the second locations in the microscopic undulation pattern.

18. The method according to claim 10, further comprising:

imparting the texturing pattern to the initial coating; and applying the EBC following the imparting.

19. A ceramic matrix composite (CMC) surface of a part having a macroscopic contour formed of CMCs; the CMC surface comprising:

fibers weaved with one another to form a microscopic undulation pattern;

an initial coating having a texturing pattern formed therein; and an environmental barrier coating (EBC) applied to the initial coating, wherein the texturing pattern follows the macroscopic contour and the microscopic undulation pattern of the CMC surface and comprises grooves which are shallower than a thickness of the initial coating and which have a critical dimension that exceeds an average particle size of a slurry of the EBC.

20. The CMC surface according to claim 19, wherein:

the fibers comprise first fibers having a first orientation and second fibers having a second orientation, the first fibers and the second fibers form a weaving pattern defining the microscopic undulation pattern, and the grooves comprise:

first grooves formed in the initial coating at first locations where the first fibers overlie the second fibers and having long axes aligned with orientations of the first fibers; and second grooves formed in the initial coating at second locations where the second fibers overlie the first fibers and having long axes aligned with orientations of the second fibers, the first grooves being sized at each one of the first locations to decrease in length with decreasing distance to adjacent ones of the second locations and arranged in accordance with the orientation of the first fibers at each of the first locations in the microscopic undulation pattern; and sizing the second grooves at each one of the second locations to decrease in length with decreasing distance to adjacent ones of the first locations and arranged in accordance with the orientation of the second fibers at each of the second locations in the microscopic an undulation pattern.

* * * * *